Figure 1:
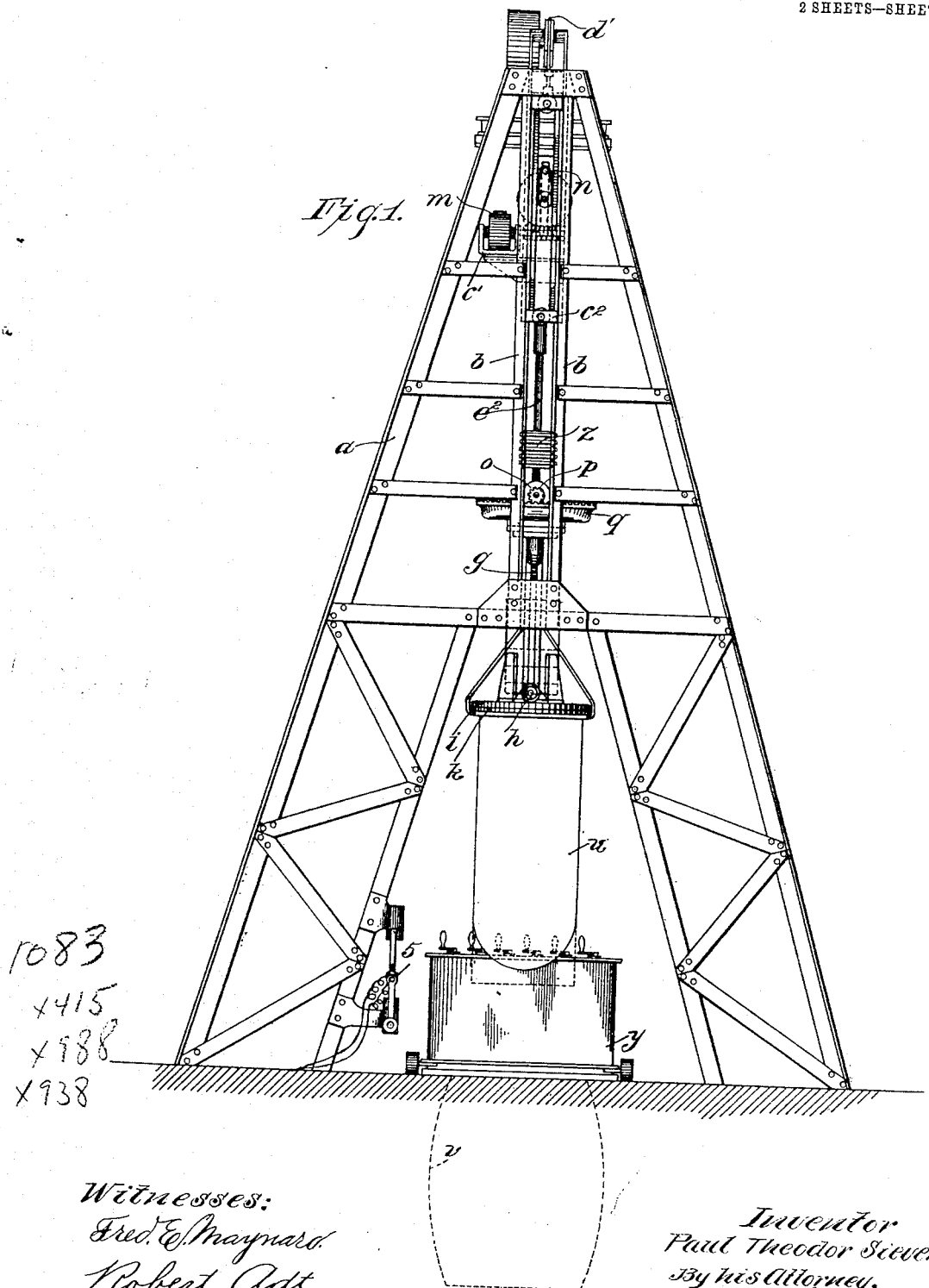

No. 785,441. PATENTED MAR. 21, 1905.
P. T. SIEVERT.
PROCESS OF PRODUCING HOLLOW GLASS ARTICLES.
APPLICATION FILED MAY 14, 1903.

2 SHEETS—SHEET 1.

Witnesses:
Fred E. Maynard.
Robert Adt.

Inventor:
Paul Theodor Sievert.
By his Attorney,
F. H. Richards.

No. 785,441. PATENTED MAR. 21, 1905.
P. T. SIEVERT.
PROCESS OF PRODUCING HOLLOW GLASS ARTICLES.
APPLICATION FILED MAY 14, 1903.

2 SHEETS—SHEET 2.

Witnesses:
F. E. Maynard.
Robert Adt.

Inventor:
Paul Theodor Sievert.
By his attorney,
F. H. Richards.

No. 785,441.

Patented March 21, 1905.

UNITED STATES PATENT OFFICE.

PAUL THEODOR SIEVERT, OF DRESDEN, GERMANY.

PROCESS OF PRODUCING HOLLOW GLASS ARTICLES.

SPECIFICATION forming part of Letters Patent No. 785,441, dated March 21, 1905.

Application filed May 14, 1903. Serial No. 157,101.

*To all whom it may concern:*

Be it known that I, PAUL THEODOR SIEVERT, a citizen of the Empire of Germany, residing at Dresden, in the Kingdom of Saxony, Empire of Germany, have invented a new and useful Process of Producing Hollow Glass Articles, of which the following is a specification.

The present invention relates to a process designed particularly for the manufacture of hollow glass articles without the necessity of employing molds, the manufactured article retaining its natural fire-polish.

In carrying the present invention into practical application the mass of glass in a suitably-heated condition and in plate-like form is secured to a suitable holder by proper clamping devices which engage with the glass plate adjacent to the periphery or edge of the latter. The major portion of the glass plate—that is, that portion lying between the secured edges thereof—is thus left free to the action of gravity, and if the holder is so positioned that the glass plate faces downwardly the latter under the action of its own weight gradually sinks or is elongated along an axis transverse to the plane of the holder. During this elongation of the stock or heated mass of glass it, together with its holder, may be in the performance of the present process subjected to a rotary motion about a substantially vertical axis or to a swinging motion about a substantially horizontal axis, or, if desired, the holder may be rotated and swung at the same time. It is contemplated that these angular motions shall be performed in whatever manner, order, direction, relation, duration, speed, and concurrence or non-concurrence (as respect the several angular motions) as shall be deemed to effect in the most satisfactory manner the gradual shaping of the article to form as the result of the combined effect of gravity and centrifugal force. If desired, this action of gravity in elongating the hollow body may be assisted by the admission of a pressure fluid. The forming article will be lowered into a reheating-chamber as occasion may demand and will be withdrawn from the reheating-chamber and returned to its former position. Thereby a reheating of the glass from time to time as often as found desirable during the gradual shaping of the body is effected, so that the whole may be continued until the glass article is finished.

In order to most conveniently secure the plate-like mass to the holder and to permit of the ready performance of the various steps involved in the complete process, I prefer at the outset to position the holder with its glass-holding face upward and after the plate is secured in position to reverse the holder, so that the glass plate shall face downwardly.

Various apparatuses may of course be used for carrying the present process into effect, and while I have shown in the drawings attached to this specification a practical organization and construction of apparatus for carrying out the steps as hereinbefore adverted to it is to be understood that such particular illustration and the description hereinafter appended is by way of illustration and not limitation.

Figure 2:
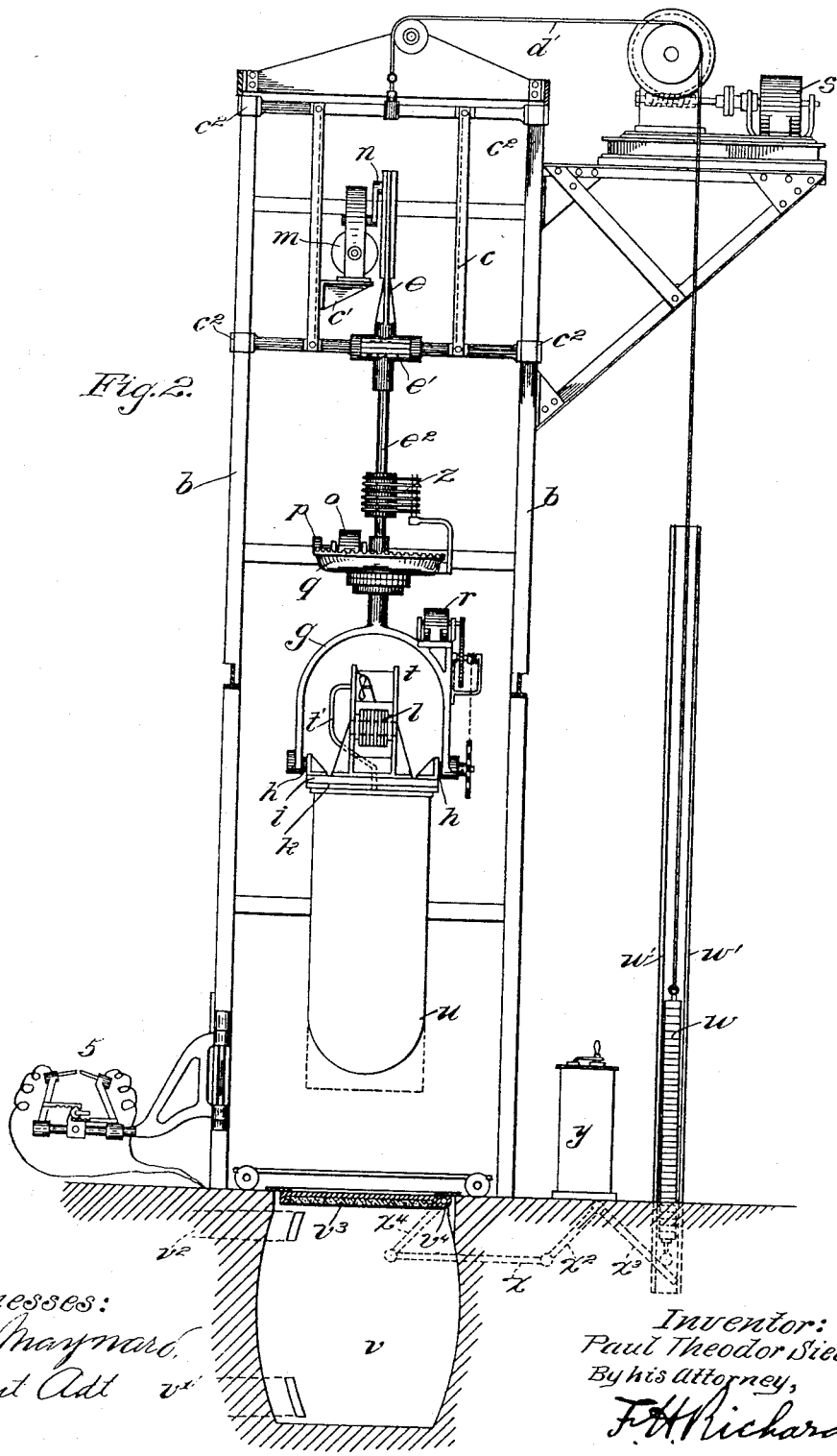

Referring to the drawings, Figure 1 is a side elevation of such apparatus; and Fig. 2 is an elevation, partly in section, from the right hand of Fig. 1.

Similar characters of reference designate corresponding parts in both figures.

In the form of the apparatus illustrated, $a$ designates a supporting tower or framework comprising uprights $b$, upon which is adapted to slide a carrier $c$, having guides $c^2$ engaging with said uprights. A counterweight $w$ is connected with the carrier $c$ by a cord $d'$, which passes over suitable guide-pulleys and also over a drum driven by a worm-gear from an electric motor $s$.

Journaled to a cross-bar of the carrier $c$ is a hub $e'$, from which extends, both above and below, a rod $e^2$. Above the hub the rod is slotted to engage with a crank-pin $n$, rotated by an electric motor $m$, carried by a bracket $c'$ on the carrier $c$. The rod $e^2$ carries a gear-wheel $q$, rotatably mounted thereon and the teeth of which engage a driving-pinion $p$, rotated by a motor $o$.

Rigid with the gear-wheel $q$ is a yoke $g$, mounted on the independent limbs of which are trunnions $h$ $h$, extending from a holder $i$, with which is adapted to coöperate a clamping member $k$ for securing the glass plate to the holder. The holder $i$ may be turned over, so that either surface may face upwardly or downwardly, as desired, by means of an electric motor $r$, connected by a chain and sprocket-wheel with a projection of one of the trunnions $h$.

It is to be noted that the motors $o$ and $r$ move with the carrier $c$, and in order to convey current thereto brushes, such as $z$, may be employed. The holder $i$ and its coöperating clamping member $k$ are represented as typical of a holding device for the plastic glass. Means for securing the glass are disclosed more specifically in United States Patents No. 641,048, of January 9, 1900, and No. 645,375, of March 13, 1900, and No. 651,059, of June 5, 1900. The current for heating the holding-plate (see United States Patent No. 645,375) may be obtained from a transformer $l$.

A heating-chamber, with induction and eduction ports $v'$ $v^2$, is designated by $v$, the same having a trap-door $v^3$ in position to be operated automatically by the moving counterweight $w$, which through a system of connecting-links $x$ $x^2$ $x^3$ causes the door to automatically swing about its pivot $v^4$ as the cylinder is caused to ascend and descend. A controller $y$ is also indicated for opening and closing the circuits to the various electric motors, controlling their speed and the direction of their rotation.

If it is desired to pass a pressure fluid into the hollow body, and thereby assist gravity in causing the glass mass to elongate, this may be had through a conduit $t'$, which is supplied from a blower or compressor driven by a motor $t$.

Having thus described my invention, I claim—

1. That improvement in the art of treating glass which consists in supporting the edges of a mass of plastic glass, leaving unsupported the central portion of said mass then permitting said unsupported portion to sink by its own weight, then lowering said mass into a reheating-chamber, then withdrawing the same therefrom, and then permitting said unsupported portion to again sink by its own weight.

2. That improvement in the art of treating glass which consists in supporting the edges only of a mass of plastic glass, then causing the unsupported portion of said mass to sink, then lowering said mass into a reheating-chamber, then elevating the same therefrom, and then again causing said unsupported portion to sink.

3. That improvement in the art of treating glass which consists in supporting the edges of a mass of plastic glass and leaving unsupported the central portion thereof, then permitting said unsupported portion to sink by its own weight thereby forming said portion into a hollow body and assisting such sinking by the admission of fluid under pressure to the interior of said body, then lowering said body into a reheating-chamber, then elevating the same, then again permitting said portion to sink and admitting fluid under pressure to the interior thereof.

4. That improvement in the art of treating glass which consists in supporting the edges of a mass of plastic glass, leaving unsupported the central portion of said mass then permitting said unsupported portion to sink by its own weight and subjecting said body to centrifugal action, then lowering said mass into a reheating-chamber then withdrawing the same therefrom and then permitting said unsupported portion to again sink by its own weight, and subjecting said body to centrifugal action.

5. That improvement in the art of treating glass which consists in supporting the edges of a mass of plastic glass and leaving unsupported the central portion thereof, then permitting said unsupported portion to sink by its own weight thereby forming said portion into a hollow body and assisting such sinking by the admission of fluid under pressure to the interior of said body and at the same time subjecting said body to centrifugal action about a vertical axis, then lowering said body into a reheating-chamber, then elevating the same, then again permitting said portion to sink and admitting fluid under pressure to the interior thereof, and at the same time subjecting said body to centrifugal action about a vertical axis.

6. That improvement in the art of treating glass which consists in supporting the edges of a mass of plastic glass, leaving the intermediate portion of said mass unsupported, then repeatedly permitting said unsupported portion to sink by its own weight and lowering and raising the same into and out of a heating-chamber.

7. That improvement in the art of treating glass which consists in supporting the edges only of a mass of plastic glass, then repeatedly permitting the unsupported portion of said mass to sink by its own weight thereby forming said portion into a hollow body and assisting such sinking by the admission of fluid under pressure to the interior of said body, lowering said body into a reheating-chamber, and withdrawing the same therefrom.

8. That improvement in the art of treating glass which consists in supporting the edges only of a mass of plastic glass, then repeatedly permitting the unsupported portion of said mass to sink by its own weight thereby forming said portion into a hollow body and assisting such sinking by the admission of fluid under pressure to the interior of said body, subjecting said body to centrifugal action about a vertical axis, lowering said body into a reheating-chamber, and withdrawing the same therefrom.

In testimony that I claim the foregoing as my invention I have signed my name in presence of two subscribing witnesses.

PAUL THEODOR SIEVERT.

Witnesses:
PAUL E. SCHILLING,
PAUL ARRAS.